(12) United States Patent
Hooper

(10) Patent No.: US 9,334,902 B2
(45) Date of Patent: May 10, 2016

(54) ROLLER ASSEMBLY

(75) Inventor: Alan Gregory Hooper, Singapore (SG)

(73) Assignee: Promor Pte Ltd, Singapore (SG)

( * ) Notice: Subject to any disclaimer, the term of this patent is extended or adjusted under 35 U.S.C. 154(b) by 0 days.

(21) Appl. No.: 13/825,625

(22) PCT Filed: May 22, 2012

(86) PCT No.: PCT/SG2012/000179
§ 371 (c)(1),
(2), (4) Date: Apr. 4, 2013

(87) PCT Pub. No.: WO2013/055291
PCT Pub. Date: Apr. 18, 2013

(65) Prior Publication Data
US 2014/0219589 A1 Aug. 7, 2014

(30) Foreign Application Priority Data

Oct. 12, 2011 (SG) .................................. 201107455

(51) Int. Cl.
| | | |
|---|---|---|
| *F16C 41/02* | (2006.01) | |
| *F16C 35/07* | (2006.01) | |
| *F16C 19/32* | (2006.01) | |
| *B63B 21/50* | (2006.01) | |
| *F16C 19/50* | (2006.01) | |
| *F16C 19/38* | (2006.01) | |
| *F16C 19/54* | (2006.01) | |

(52) U.S. Cl.
CPC .............. *F16C 41/02* (2013.01); *B63B 21/507* (2013.01); *F16C 19/507* (2013.01); *F16C 35/07* (2013.01); *F16C 19/38* (2013.01); *F16C 19/546* (2013.01); *Y10T 29/49679* (2015.01)

(58) Field of Classification Search
CPC .......... F16C 41/02; F16C 35/07; F16C 43/02; B63B 22/026; B63B 21/507
USPC ............. 384/99, 129, 192, 619, 58, 105, 247, 384/256; 114/230.12, 293; 441/4, 5; 29/898.06
See application file for complete search history.

(56) References Cited

U.S. PATENT DOCUMENTS

| | | | | |
|---|---|---|---|---|
| 798,350 | A * | 8/1905 | Lake et al. .................... | 384/601 |
| 2,123,754 | A * | 7/1938 | Talbot ............................ | 384/192 |
| 2,312,648 | A * | 3/1943 | Jones ............................. | 72/248 |
| 2,372,378 | A * | 3/1945 | Hlavaty ......................... | 474/108 |

(Continued)

FOREIGN PATENT DOCUMENTS

| | | |
|---|---|---|
| GB | 2320231 A | 6/1998 |
| WO | WO-8602329 A1 | 4/1986 |
| WO | WO-9307049 A1 | 4/1993 |

OTHER PUBLICATIONS

Examination Report in GB Application No. 1402833.6 dated Mar. 28, 2014.

(Continued)

*Primary Examiner* — Marcus Charles
(74) *Attorney, Agent, or Firm* — Marshall, Gerstein & Borun LLP

(57) ABSTRACT

A roller assembly for a turret, a turret bearing system for a turret, and a method of manufacture of a roller assembly for a turret. The roller assembly comprises a first and a second roller; an axle on which the first and the second rollers are rotatably mounted; and a biasing mechanism located between the first and the second rollers and supporting the axle.

17 Claims, 12 Drawing Sheets

(56) References Cited

U.S. PATENT DOCUMENTS

| | | | | |
|---|---|---|---|---|
| 3,309,909 | A | * | 3/1967 | Wilson .................... 72/237 |
| 3,580,034 | A | * | 5/1971 | Wilson .................... 72/237 |
| 4,343,055 | A | * | 8/1982 | Bergling ................ 384/455 |
| 4,547,120 | A | * | 10/1985 | Turner et al. ........... 414/744.2 |
| 5,746,148 | A | * | 5/1998 | Delago ................ 114/230.12 |
| 5,850,800 | A | * | 12/1998 | Commandeur ........ 114/230.12 |
| 6,269,762 | B1 | * | 8/2001 | Commandeur ........ 114/230.12 |
| 6,886,448 | B2 | * | 5/2005 | Urvoy .................... 89/37.07 |
| 7,252,610 | B2 | * | 8/2007 | Miyata ................... 474/122 |
| 7,891,508 | B2 | * | 2/2011 | Delago ................... 212/253 |
| 2004/0261683 | A1 | * | 12/2004 | Lindblade et al. ....... 114/230.12 |
| 2007/0264889 | A1 | * | 11/2007 | Boatman et al. ............ 441/5 |
| 2008/0252957 | A1 | * | 10/2008 | Thibout et al. ............ 359/223 |

OTHER PUBLICATIONS

International Search Report and Written Opinion for PCT/SG2012/000179 dated Aug. 21, 2012.

International Preliminary Report on Patentability for PCT/SG2012/000179 dated Jan. 23, 2013.

* cited by examiner

ROLLER ASSEMBLY

FIELD OF INVENTION

The present invention relates broadly to a roller assembly for a turret, a turret bearing system for a turret, and a method of manufacture of a roller assembly for a turret.

BACKGROUND

In recent years, the use of floating facilities has become prevalent in the offshore oil and gas industry for the extraction and production of oil and gas from offshore fields. Floating facilities such as the floating, production, storage and offloading (FPSO) unit or the floating, storage and offloading (FSO) unit are typically floating platforms converted from oil tankers or in some cases vessels or barges specifically designed and built for the purpose.

The growth in interest of such floating facilities is due to the ease of installation, the minimal fixed infrastructure required, flexibility in usage and most importantly the ability to weathervane in response to the prevailing weather conditions as compared to the fixed oil platforms or oil rigs. When these floating facilities are moored in the open sea and exposed to prevailing weather conditions, their ability to weathervane freely stems from the mooring system that they utilize. One such mooring system is the turret mooring system.

WO2009/031971 describes a turret mooring system where a turret in the form of a vertical cylindrical shaft is fitted through a moonpool within the floating platform. The flange on one end of the cylindrical shaft is in turn mounted on a turret bearing system which is fixed to the deck of the vessel. On the other end of the cylindrical shaft, a plurality of catenary mooring lines extends out from the shaft to anchor it to the seabed. In addition, a plurality of production risers runs from the wellheads on the seabed to the same end of the cylindrical shaft. The oil is then transferred from the topside of the shaft to the oil processing equipment or storage tanks of the floating platform. This assembly of the turret, the mooring lines, the turret bearing system and the deck of the vessel allows the turret to be fixed to a position with respect to the seabed and the floating platform to rotate or swivel about the vertical axis of the cylindrical turret, enabling the weathervane ability of the floating platform.

In this turret mooring system, the turret bearing system consists of roller assemblies arranged along the circumference of the circular turret bearing system with the axes of the cylindrical rollers pointing toward the axis of the circular bearing. The roller assembly 100, as shown in FIG. 1, consists of a single rotatable cylindrical roller 102 supported by a non-rotating axle 104 which is bolted to the hydraulic supports 106, 108 on each end and in turn are fixed to a base plate 110.

The hydraulic supports 106, 108 form a hydraulic system whereby they are interconnected via a hydraulic line sharing the same source of hydraulic fluid. In such a set up of the hydraulic system, the two hydraulic supports 106, 108 would act in a counteracting manner. Therefore when a downward force acts on one of the hydraulic supports e.g. 106 and causes it to be depressed, the hydraulic fluid would be forced to flow to the other hydraulic support e.g. 108 and causes it to be elevated.

In the normal operation of the floating platform out at sea, the floating platform is susceptible to environmental conditions and would naturally roll or pitch following the prevailing weather conditions. Such motion would cause radial loading on the turret bearing system. The turret bearing system 200 described in WO2009/031971 attempts to cushion the radial movement of the shaft by interspersing radial bearing assemblies 202 with the roller assemblies 100 as shown in FIG. 2. However, due to practical considerations, including the difficulties in positioning the turret entirely centrally within the moonpool, the radial bearing assemblies 202 still have to allow some movement of the shaft. Thus, the radial loading on the roller assemblies remains an issue.

It would therefore be an improvement in the art if a roller assembly and/or turret bearing system could be devised which overcome one or more of these deficiencies.

SUMMARY

According to an aspect of the present invention, there is provided a roller assembly for a turret bearing system, the roller assembly comprising a first and a second roller; an axle on which the first and the second rollers are rotatably mounted; and a biasing mechanism located between the first and the second rollers and supporting the axle.

A guiding arm may be coupled to each end of the axle.

The two rollers (i.e. the first and the second rollers) may be independently rotatably mounted on the axle.

A U-shaped bracket may couple the axle to the biasing mechanism.

The U-shaped bracket may be configured to be receivable in a groove on the axle such that lateral movement of the axle is restricted.

The biasing mechanism may be disposed in between the two rollers.

The biasing mechanism may be a hydraulic support.

The hydraulic support may comprise an outer housing vertically moveably mounted on a piston.

A guide bearing may connect the outer housing of the hydraulic support to the piston to guide the vertical motion of the outer housing.

A split retaining ring on the outer housing of the hydraulic support may limit the extension of the outer housing as it moves vertically upward.

A cavity may be provided in the piston of the hydraulic support, the cavity including a spring mechanism.

The hydraulic support may be configured for interconnection with other hydraulic supports to a shared source of hydraulic fluid.

Each guiding arm may be pivotably mounted on a support frame.

A pair of the guiding arms may be configured to guide the vertical movement of the roller assembly.

According to another aspect of the present invention, there is provided a turret bearing system for a turret of a ship, the turret bearing system comprising a plurality of roller assemblies as defined above wherein the plurality of roller assemblies are configured in use to be disposed radially around a moon pool of the ship.

According to another aspect of the present invention, there is provided a method of manufacture of a roller assembly for a turret bearing system, the method comprising the steps of providing a first and a second roller, providing an axle, rotatably mounting the first and the second rollers on the axle, providing a biasing mechanism and mounting the axle on the biasing mechanism, wherein the biasing mechanism is located between the first and the second rollers, and is supporting the axle.

The method may further comprise the step of providing a guiding arm coupled to each end of the axle.

The two rollers (i.e. the first and the second rollers) may be independently rotatably mounted on the axle.

The method may further comprise the step of providing a U-shaped bracket for coupling the axle to the biasing mechanism.

The U-shaped bracket may be configured to be receivable in a groove on the axle such that lateral movement of the axle is restricted.

The biasing mechanism may be disposed in between the two rollers.

The biasing mechanism may be a hydraulic support.

The hydraulic support may comprise an outer housing vertically moveably mounted on a piston.

A guide bearing may connect the outer housing of the hydraulic support to the piston to guide the vertical motion of the outer housing.

The method may further comprise the step of providing a split retaining ring on the outer housing of the hydraulic support to limit the extension of the outer housing as it moves vertically upward.

The method may further comprise the step of providing a cavity in the piston of the hydraulic support, the cavity including a spring mechanism.

The hydraulic support may be configured for interconnection with other hydraulic supports to a shared source of hydraulic fluid.

Each guiding arm may be pivotably mounted on a support frame.

A pair of the guiding arms may be configured to guide the vertical movement of the roller assembly.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 6b shows a side view of a roller assembly shown in FIG. 6a.

FIG. 6c shows a cross-sectional side view of a roller assembly shown in FIG. 6a.

FIG. 6d shows a cross-sectional front view of a roller assembly shown in FIG. 6a.

DETAILED DESCRIPTION

The present inventors recognize that in a turret bearing system such as the turret bearing system 200 disclosed in WO2009/031971, radial movement of the turret shaft may have a significant impact on the performance and functionality of the rollers 102 in the turret bearing system 200. Therefore, in order to provide a better design for a turret bearing system to moderate such impact, the inventors conducted detailed analysis of the interaction between the radial and axial load acting on the turret bearing system 200.

When a turret shaft (not shown) is mounted on the turret bearing system 200 such that the flange (not shown) at one end of the turret shaft sits on the cylindrical rollers 102, the axial load acting on the turret bearing system 200 may be distributed over the rollers 102 in a manner where each roller 102 assumes a portion of the total load. The portion of axial load supported by each roller 102 may be transpired as vertical load and is denoted by Fv in FIG. 1.

On the other hand, the radial movement of the turret may exert radial loading to the turret bearing system 200 and this radial force may again be distributed to the individual rollers 102. As a result, the distributed radial force may translate to a lateral force acting on the top of each roller 102 as denoted by Fh in FIG. 1. This lateral force Fh acting on the roller 102 may create a moment of force M on the entire roller assembly 100, which may be construed as a tendency to rotate the entire roller assembly, as denoted by M in FIG. 1.

Figure 1:
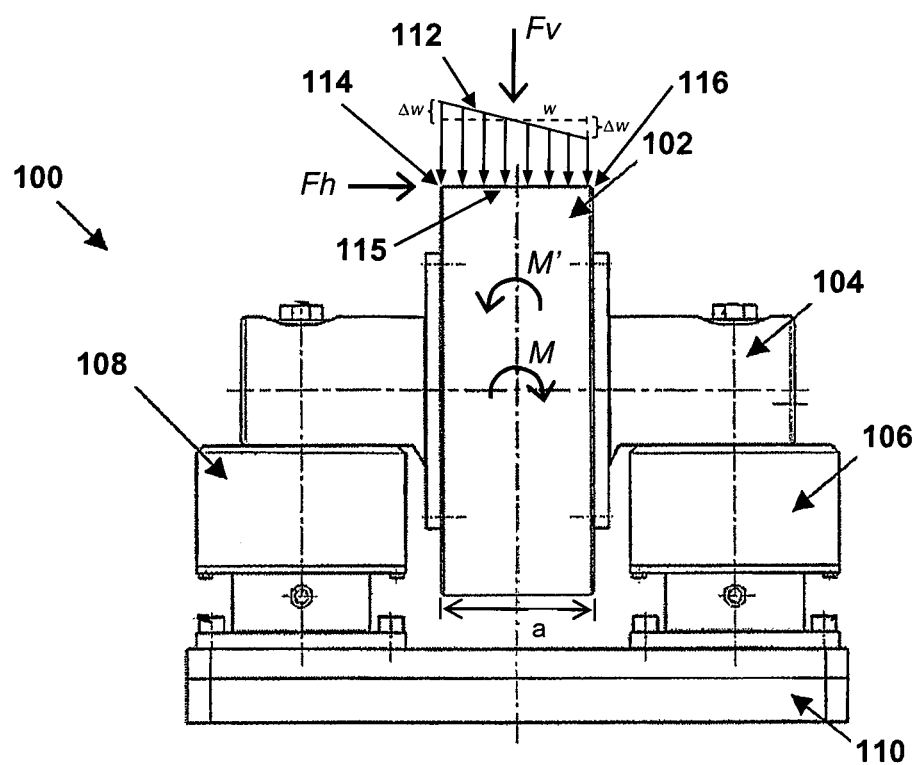
FIG. 1 shows a front view of a prior art roller assembly for a turret.
Figure 2:
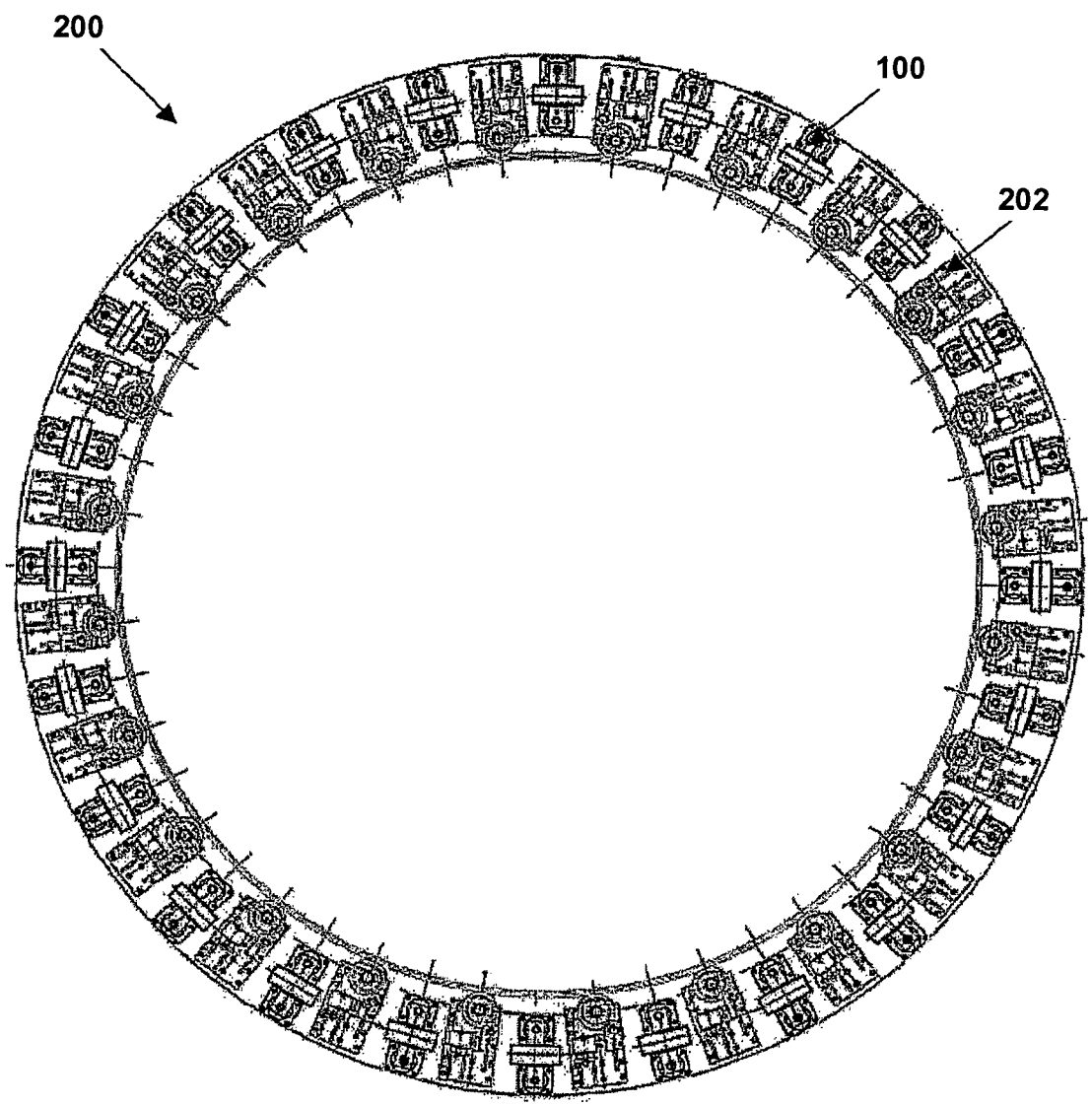
FIG. 2 shows a top view of a prior art turret bearing system comprising roller assemblies of FIG. 1.

In the roller assembly 100, the lateral force Fh may result in the cylindrical roller 102 and its axle 104 trying to rotate slightly or tilt in the direction of the moment M as shown in FIG. 1. This tendency of the roller 102 to rotate slightly or tilt in the direction of the moment M, may result in the contact surface 115 of the roller 102, which is in contact with the flange of the turret shaft, to experience a linearly distributed load (shown as load graph 112) as illustrated in FIG. 1. On the side 114 where the lateral force Fh is acting, the intensity of the distributed load may be at a maximum of w+Δw, and on the opposite side 116, the intensity of the distributed load may be at a minimum of w−Δw as shown in FIG. 1. This linearly distributed load 112 may create a restoring moment M' to counter the moment M created by the lateral force Fh.

In the single roller assembly 100 described above, the restoring moment M' of the roller assembly 100 may be represented by the following equation.

$$M'=(2\times\Delta w)/2\times a\times(a/6)=(a^2\Delta w)/6$$

Figure 3:
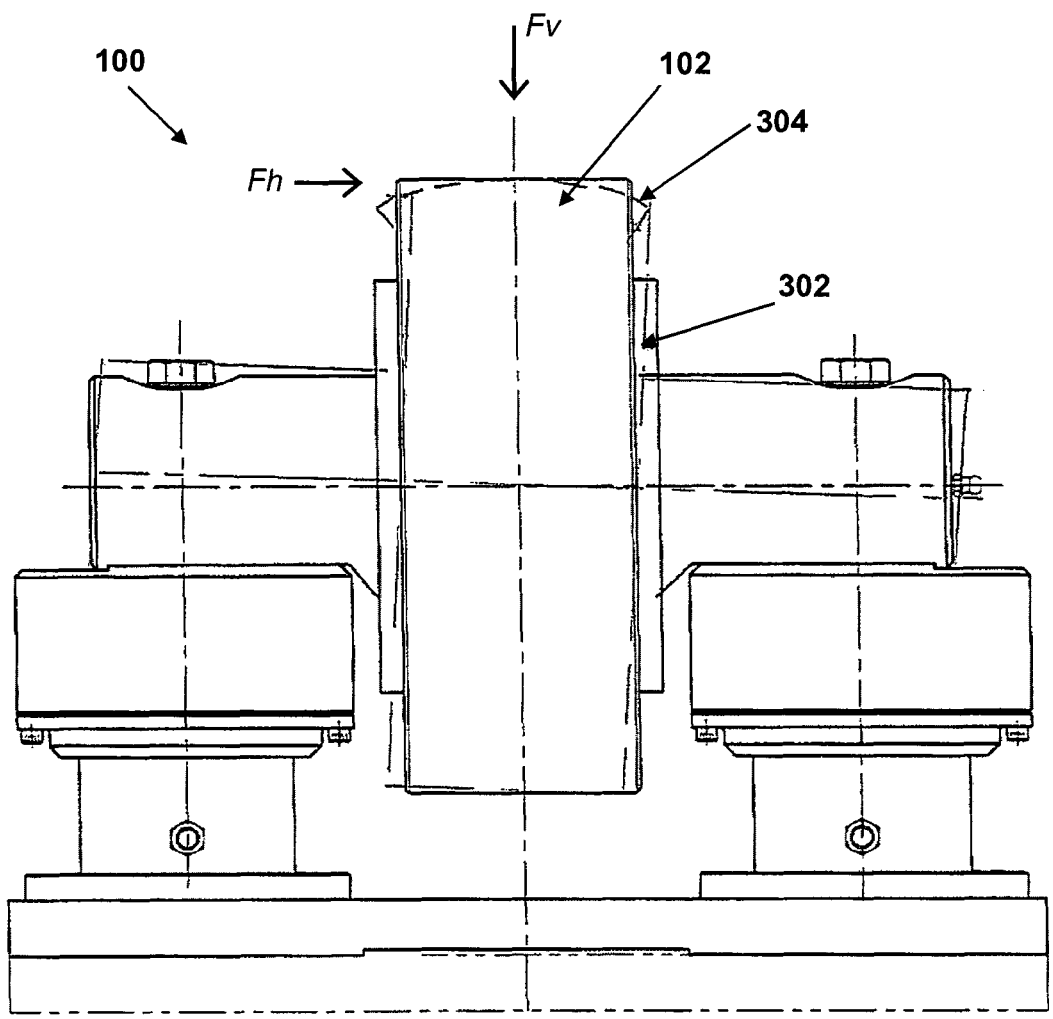
FIG. 3 shows a front view of the prior art roller assembly of FIG. 1 illustrating different forces applied during radial loading.

As the lateral force Fh increases, the difference between the intensity of the distributed load at the ends 114, 116 of the roller 102 may become larger. Once the intensity of the linearly distributed load 112 at one end 114, 116 exceeds the material limits of the roller 102, material failure might occur at that end 114, 116. As a consequence, the roller 102 may experience deformation at its ends 114, 116. In an instance of extreme deformation, the entire roller 102 might be permanently tilted 302 and deformed 304 as illustrated in FIG. 3. Even when the intensity of the distributed load is within the acceptable limits of the material, prolonged exposure of uneven load distribution on the contact surface, especially with the higher load intensity at the ends 114, 116 of the roller 102, may result in different rate of wear across the span of the contact surface 115. Deformation 304 of the roller 102 may occur.

In the turret bearing system 200, the addition of radial bearing assemblies 202 may have the effect of reducing the lateral force Fh acting on the roller. However, it may not be able to ease the uneven load distribution situation on the contact surface 115 of the roller 102. And therefore this may not be sufficient or adequate to moderate the overall impact of radial movement of turret on the rollers 102 of the turret bearing system 200.

One possible method of easing the uneven load distribution condition may be to reduce the difference between the intensity of the load distribution at both ends 114, 116 by increasing the width of the roller 102. This may create a larger restoring moment arm and thus result in a smaller difference in the load intensity at its ends as compared to a roller 102 with a narrower width experiencing the same lateral force Fh. However, a wider roller 102 may lead to problems with respect to the rotational speed. Naturally, the end 114 of the roller 102 which is nearer to the centre of the turret may have to rotate at a slower speed as compared to the other end 116 of the roller 102 which is farther. This differential in speed may result in sliding motions along the contact surface 115 as a single roller 102 can only rotate at a single speed. Therefore this solution is rendered unfeasible.

The following embodiments of the invention seek to provide more desirable solutions to the above problem.

Figure 4:
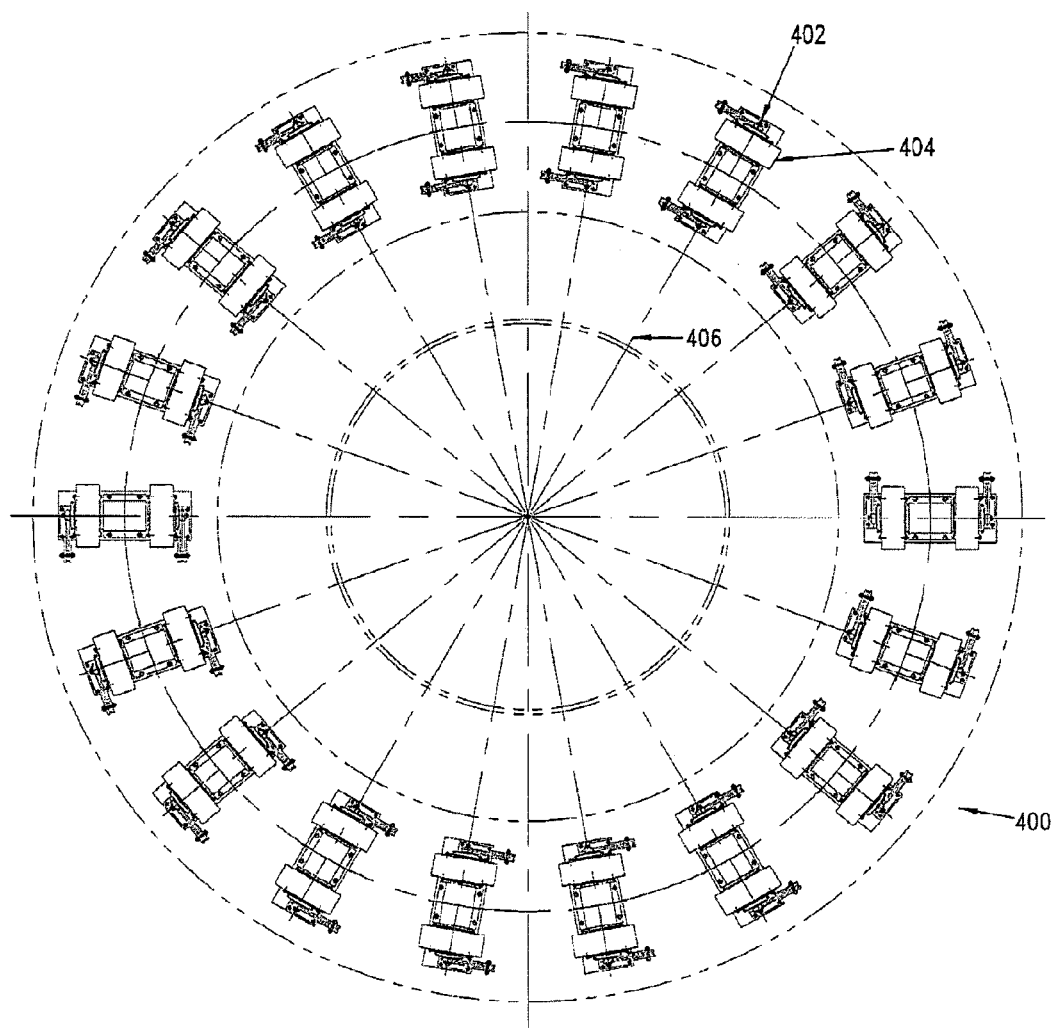
FIG. 4 shows a top view of a turret bearing system according to an example embodiment.

FIG. 4 is a schematic diagram illustrating the top view of an embodiment of a turret bearing system 400 of the present invention. The turret bearing system 400 may include a plurality of roller assemblies 402 fitted on the deck of the floating platform and arranged along the circumference of the circular turret bearing system 400 with the axis 406 of the cylindrical rollers 404 in each of the roller assemblies 402 perpendicular to the axis of the circular turret bearing system 400. The number of roller assemblies 402 in a turret bearing system 400 is dependent on the size of the turret. The system shown in FIG. 4 is provided by way of an example only.

Figure 5:
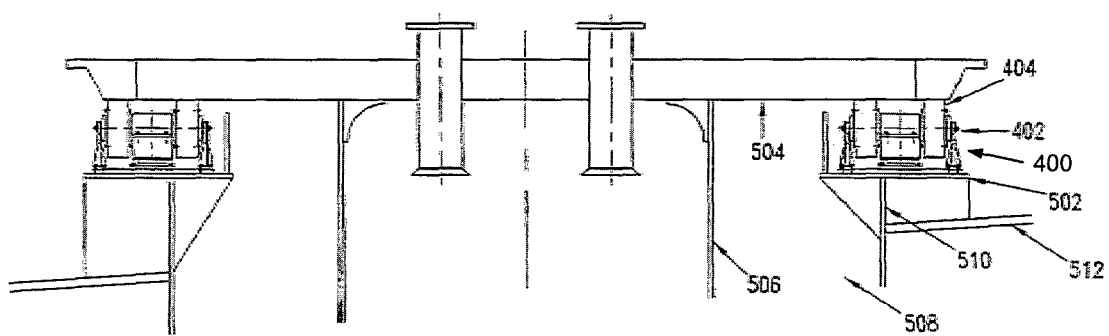
FIG. 5 shows a cross-sectional side view of the turret bearing system of FIG. 4 supporting a turret.

FIG. 5 is a cross sectional view illustrating an example of the interaction between the turret shaft 506, the roller assemblies 402 of the turret bearing system 400 and the deck 512 of the floating platform. The vertical turret shaft 506 may be fitted in the moonpool 508 of the floating facilities with the shaft flange 504 at the upper end of the vertical turret shaft 506 resting on the highest tips of the rollers 404 in a roller assembly 402. The roller assembly 402 may in turn be fixed on the flange portion 502 of a circular combing 510 extruded from the deck 512 of the floating facilities. The circular combing 510 and its flange portion 502 may be erected such that when the turret bearing system 400 is fitted on the flange portion 502, the turret resting on the turret bearing system 400 may lie on a plane parallel to the horizontal plane of the ground even when the deck 512 of the floating platform is constructed in an inclined manner. It is understood that other configurations of the interaction between the turret shaft 506, the roller assemblies 402 of the turret bearing system 400 and the deck 512 of the floating platform may also be possible. The configuration shown in FIG. 5 is provided by way of an example only.

Figure 6A:
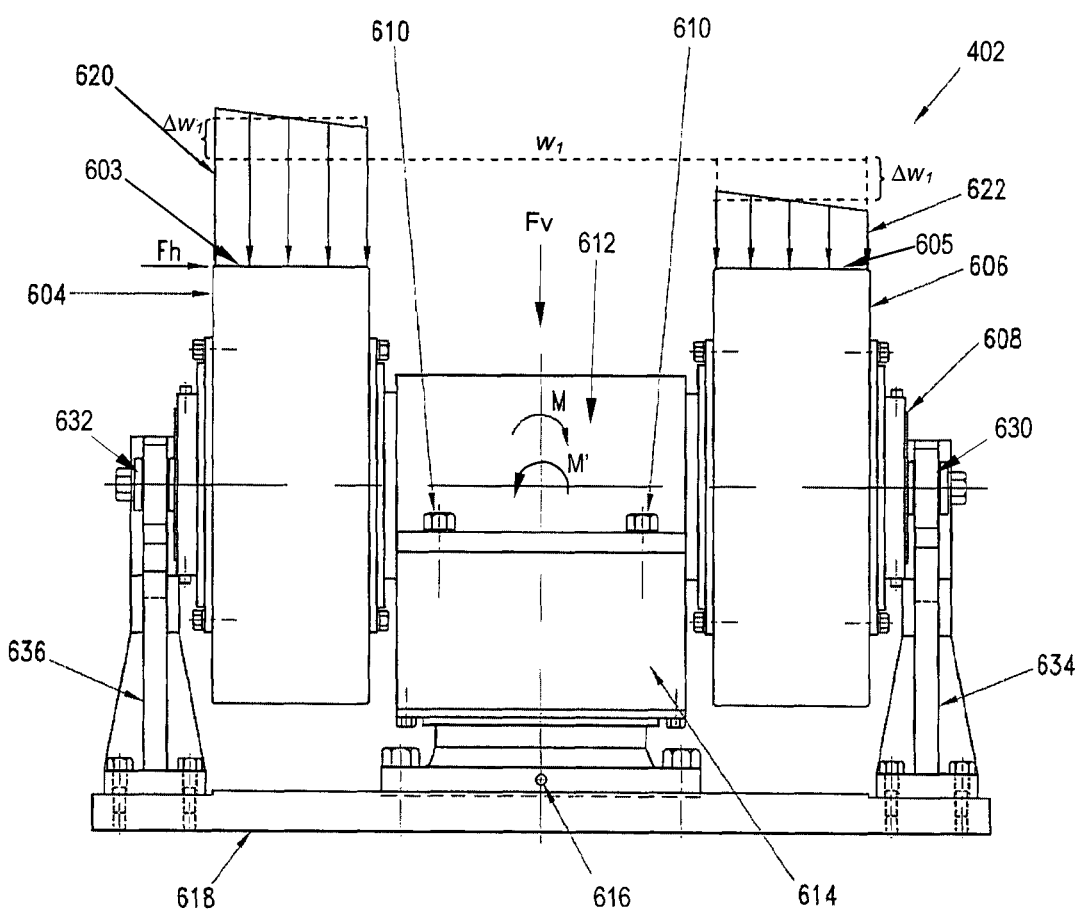
FIG. 6a shows a front view of a roller assembly for a turret according to an example embodiment.
Figure 6B:
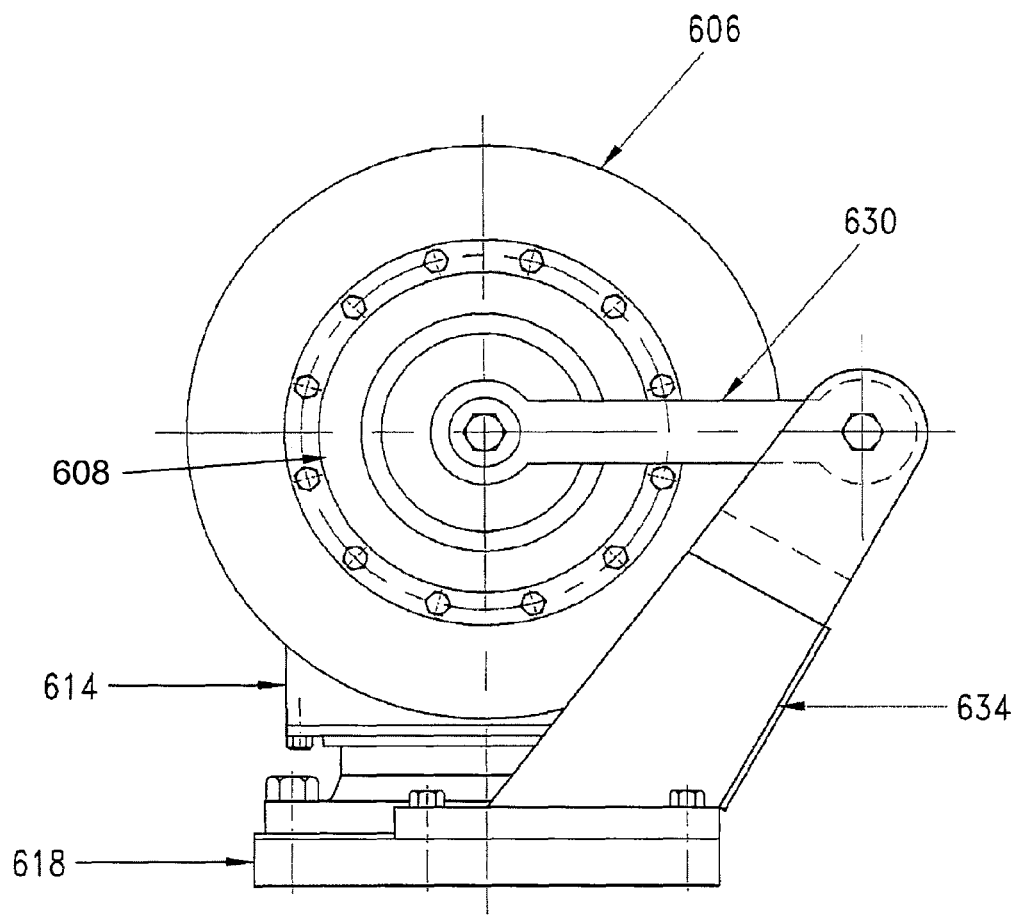
Figure 6C:
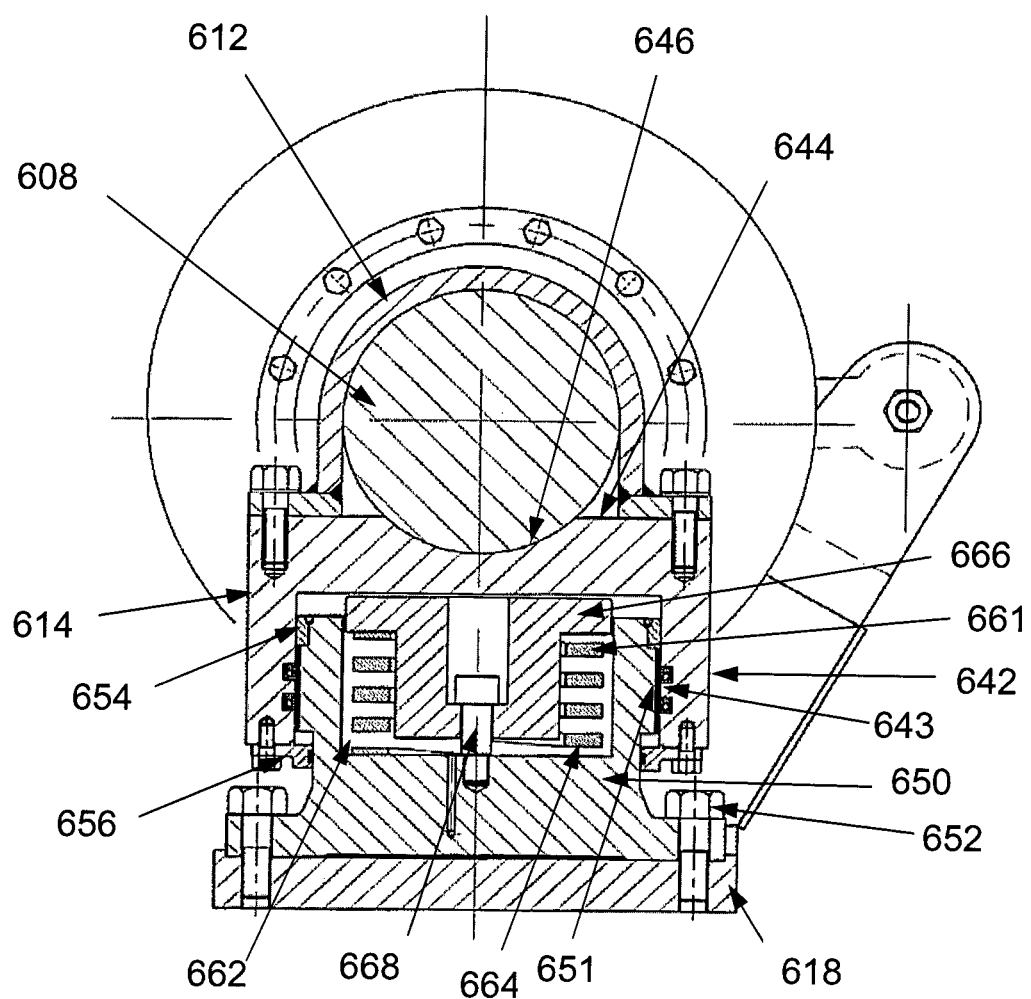
Figure 6D:
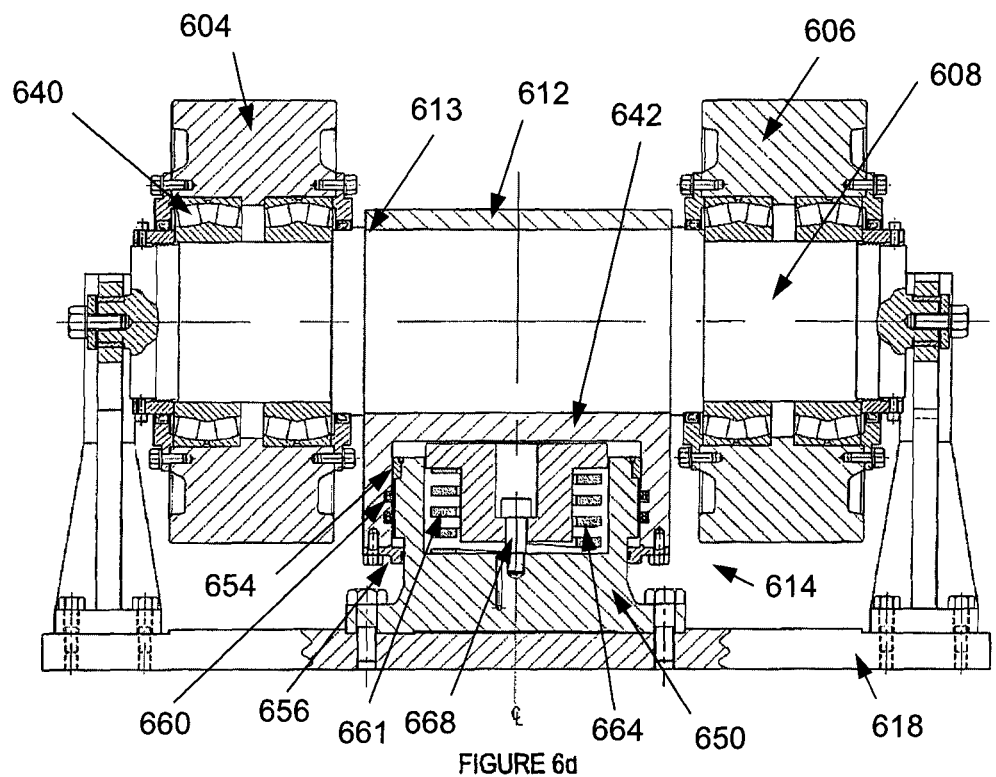

An embodiment of the roller assembly 402 is illustrated in FIGS. 6a, 6b, 6c and 6d. FIG. 6a and FIG. 6b show a respective front view and side view of the roller assembly 402. FIGS. 6c and 6d show a respective cross sectional front and side view of the roller assembly 402. The roller assembly 402 may include a first and a second rotatable, cylindrical roller 604, 606 spaced apart and rotatably mounted on a non-rotating axle 608. The non-rotating axle 608 may in turn be coupled to a biasing mechanism, for example a hydraulic support 614, by a U-shaped bracket 612 at the middle portion of the non-rotating axle 608, in between the two rollers 604, 606. The axle 608 may be supported by the biasing mechanism. The hydraulic support 614 may in turn be fixed to a base plate 618. At each end of the non-rotating axle 608, a guiding arm 630, 632 may be coupled to the non-rotating axle 608. Each guiding arm 630, 632 may be pivotably connected to a support frame 634, 636. The support frames 634, 636 may in turn be fixed on the same base plate 618.

The two rotatable cylindrical rollers 604, 606 may be spaced apart and connected to the axle 608 such that the rollers 604, 606 do not slide along the axle 608 nor interfere with each others rotation as they rotate. Each of the rollers 604, 606 may be free wheeling and able to rotate at its own rotational speed. Each roller 604, 606 may be made rotatable by fitting a bearing between the rollers 604, 606 and the non-rotating axle 608. In the embodiment shown in FIG. 6d, each roller 604, 606 is mounted on the non-rotating axle 608 via two spherical type roller bearings 640. The advantages of using spherical type roller bearings are that they can withstand high load capacity and they possess self-aligning capability. It is understood that other types of rolling element bearings or journal bearings may also be used. Further, it is also understood that variations in the number of bearings used and variations in the combination of bearings and rollers may be possible. FIG. 6d is thus provided by way of an example only.

The non-rotating axle 608 may be held on the hydraulic support 614 by the U-shaped bracket 612 such that the non-rotating axle 608 may not slide longitudinally. This may be achieved, for example, by having a groove 613, as shown in FIG. 6d, on the non-rotating axle 608 such that the U-shaped bracket 612 may fit into the groove 613 and thus restrict the lateral movement of the axle. Further, the grooved portion of the non-rotating axle 608 may seat in a corresponding depression 646 on the top surface 644 of the outer housing 642 of the hydraulic support 614, as shown in FIG. 6c. When fully seated, the lateral movement of the axle may also be restricted, as the top surface 644 of the outer housing 642 fits into the groove 613, as shown in FIG. 6d. The U-shaped bracket 612 may in turn be attached to the top surface 644 of the outer housing 642 of the hydraulic support 614 by means of bolts 648.

The hydraulic support 614 may include an outer housing 642 and a piston 650 in which the outer housing 642 may be vertically and movably mounted on the piston 650. The piston 650 may in turn be fixed to the base plate 618 by means of bolts 652. The vertical motion of the outer housing 642 may be guided by a guide bearing 654 connecting the outer housing 642 to the piston 650. At the bottom of the outer housing 642, a split retaining ring 656 may be attached such that it may limit the extension of the outer housing 642 as it moves vertically upwards with respect to the piston 650. It is understood that the term 'vertical', when used in this context, means perpendicular to the plane of the base plate 618 and/or perpendicular to the plane of the deck of a ship when the roller assembly is mounted on the deck of the ship. In between the internal walls 643 of the outer housing 642 and the external walls 651 of the piston 650 where they overlap, seals 660 may be provided such that hydraulic fluid (not shown) within the hydraulic support 614 may be contained within the space enclosed by the outer housing 642 and the piston 650.

Within the piston 650, a cavity 662 may be provided such that a spring mechanism 661 may be included. The spring mechanism 661 may include a spring 664 placed in the cavity 662 within the piston 650. The spring 664 may be held in place by a collar 666 and a bolt 668. It is understood that the spring 664 may be in the form of a helical type, disc type or any other type. It is also understood that other configurations of the spring mechanism 661 may be used.

In the normal operation of the hydraulic support 614, the outer housing 642 may not be in contact with the collar 666 and spring 664. Accordingly, the biasing ability of the outer housing 642 may solely be dependant on the pressure of hydraulic fluid. However, in the event there is insufficient hydraulic fluid due to any reason (e.g. leakage), the collar 666 and spring 664 will act as a secondary biasing mechanism to ensure that the hydraulic support 614 continues to bias the roller assembly 402.

At each end of the non-rotating axle 608, the guiding arms 630, 632 may guide the vertical movement of the roller assembly 402 and restrict movement of the roller assembly in other directions. It is understood that other mounting configurations of the roller assembly 402 may also be used. The system shown in FIGS. 6a, 6b, 6c and 6d are provided by way of an example only.

The hydraulic support 614 of each roller assembly 402 in the turret bearing system 400, may be interconnected via a hydraulic line (not shown) connected between respective hydraulic fluid ports 616 and sharing the same source of hydraulic fluid. In this arrangement, the hydraulic supports 614 may collectively form a biasing system in which the hydraulic supports 614 may work in a coordinated manner to keep the vertical cylindrical turret 506 stationary while the floating platform may roll or pitch under prevailing weather conditions. For example, when some of the hydraulic supports 614 are depressed due to roll or pitch, the hydraulic fluid may be forced to flow to other hydraulic supports 614 to cause them to be elevated. Accordingly, each hydraulic support 614 may be depressed or elevated to a different degree such that they are coordinated to maintain the vertical cylindrical turret 506 in position and to remain unaffected by the roll or pitch.

When the vertical cylindrical turret 506 is mounted on the turret bearing system 400 such that the flange 504 at the upper end of the turret shaft 506 sits on the cylindrical rollers 604, 606 of the roller assemblies 402, the axial load acting on the turret bearing system 400 may be distributed to the rollers 604, 606 of all the rollers assemblies 402 in the turret bearing system 400. Each pair of rollers 604, 606 may assume a portion of the total axial load and the portion of the axial load supported by each pair of rollers 604, 606 may be translated as vertical load acting on the respective pair. This vertical load acting on each pair of rollers 604, 606 is denoted by Fv in FIG. 6a.

When the floating platform rolls or pitches under the influence of the prevailing weather conditions, radial movement of the turret may cause radial loading to the turret bearing system 400. This radial force may be distributed to the rollers 604, 606 of the rollers assembly 402. As a result, the distributed radial force may be translated as lateral force acting on the top of each pair of rollers 604, 606 as denoted by Fh in FIG. 6a. This lateral force Fh acting on each pair of rollers 604, 606 may create a moment of force M on the entire roller assembly 402, which can be construed as a tendency to rotate the entire roller assembly 402, as denoted by M in FIG. 6a.

As a result of the tendency to rotate slightly or tilt in the direction of the moment M, the contact surfaces 603, 605 of the pair of rollers 604, 606, which are in contact with the flange 504 of the turret shaft 506, may experience a linearly distributed load (shown as load graphs 620, 622) on each of the rollers 604, 606 as illustrated in FIG. 6a. In this embodiment, due to the spacing between the rollers 604, 606, the linearly distributed load 620, 622 on each of the rollers 604, 606 may only possess slight linearity. Thus the load distribution on each roller 604, 606 may be approximated as a uniformly distributed load. Therefore the intensity of the uniformly distributed load 620 on the contact surface of the roller 604 closer to the lateral force may be approximated to $w_1+\Delta_1$ (as shown in FIG. 6a), while the intensity of the uniformly distributed load 622 on the contact surface of the roller 606 away from the lateral force may be approximated to $w_1-\Delta w_1$ (as shown in FIG. 6a). The difference between the load intensity on each of the rollers 604, 606, may result in a restoring moment M' created to counter the moment of the lateral force Fh as shown in FIG. 6a.

Since the load distribution may be approximated to a uniformly distributed load, taking the width of each roller 604, 606 in the roller assembly 402 to be equal to the width of the single roller 102 in the prior art single roller assembly 100, and the width of the spacing between the rollers 604, 606 to be twice the width of each roller 604, 606, while keeping all the forces and load constant, the equation of the restoring moment M' of the roller assembly 402 in this embodiment may be represented by the equation below. It is understood that other dimensions may also be used.

$$M_1'=(w_1+\Delta w_1)\times a\times 3a/2-(w_1\Delta w_1)\times a\times 3a/2=3a^2\Delta w_1$$

Thus this embodiment may create a larger restoring moment M' under the same conditions as discussed with respect to the prior art system. At the same time, this may be achieved while exposing the individual rollers 604, 606 to an approximately uniform load distribution. One qualitative advantage of this embodiment is that the roller assembly 402 may withstand a significantly higher radial force before any permanent deformation or damage to the rollers 604, 606 may occur. At the same time, the rollers 604, 606 may have a longer lifespan under the same operating conditions, as the rollers 604, 606 in this embodiment are not repeatedly exposed to uneven load distributions. This may give rise to an overall improved function and stable operation of the entire turret bearing system 400, whereby the turret may remain in position regardless of the roll and pitch motions of the floating platform. Furthermore, the twin roller 604, 606 design of the roller assembly 402 may provide additional advantage in that there is inherent redundancy in the number of rollers provided. Another advantage of the embodiment of the present invention may be that the turret bearing system 400 may preferably not require any additional radial bearing, because the roller assembly in the embodiment of the present invention may be sufficient and adequate to withstand both the axial load and the radial load of the turret shaft.

Figure 7:
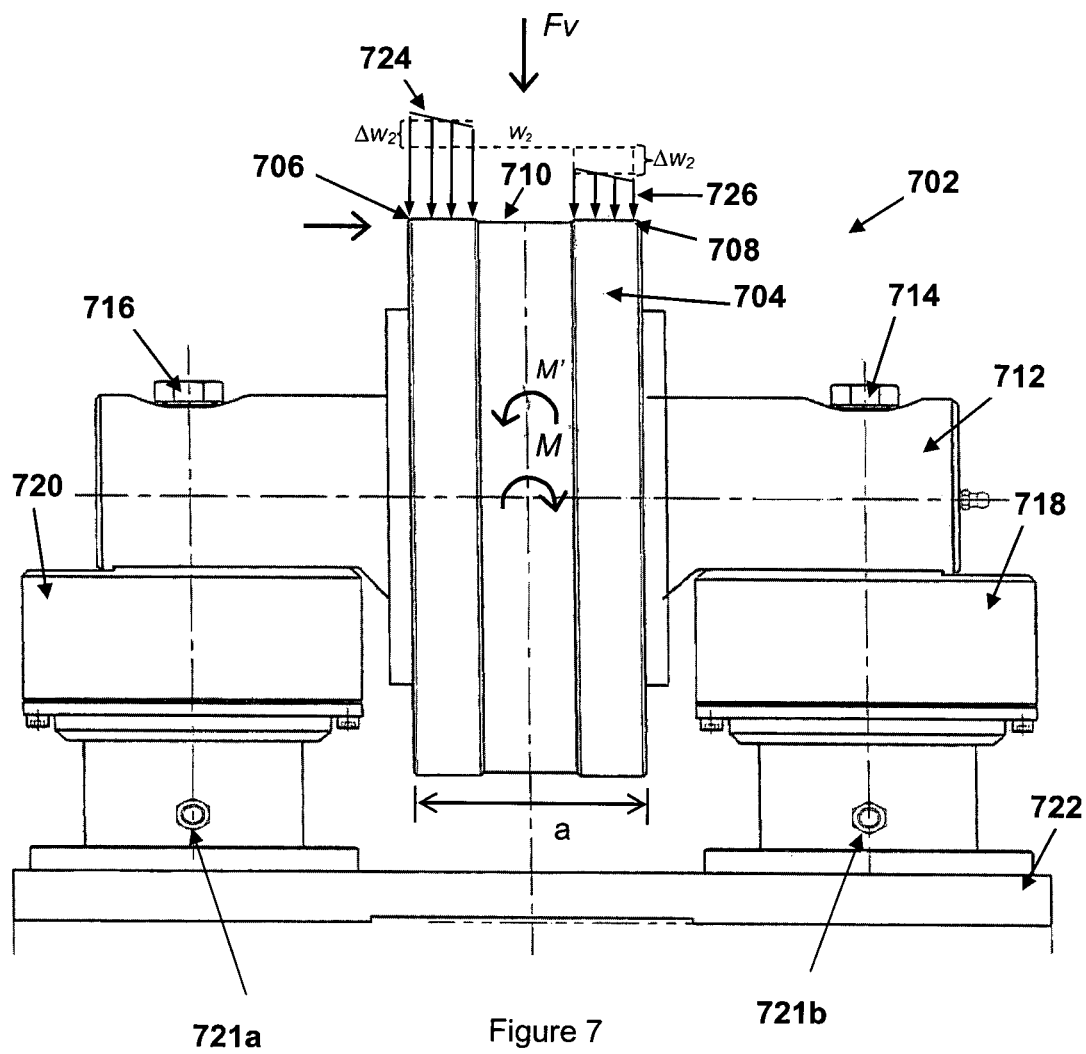
FIG. 7 shows a front view of a roller assembly for a turret according to an alternate example embodiment.

Another embodiment of a roller assembly 702 is illustrated in FIG. 7. The roller assembly 702 may include a single rotatable groove type roller 704, where the roller body has two contacting surfaces 706, 708 separated by an inner recess 710, supported by a non-rotating axle 712 which may be bolted at both ends by bolts 714, 716 to a respective biasing mechanism, for example hydraulic supports 718, 720. Both the hydraulic supports 718, 720 may in turn be fixed to a base plate 722.

The groove type roller 704 may be designed such that the width of each of the contacting surfaces 706, 708 and the recess 710 are one third the overall width of the groove type roller 704. Other fractional dimension may also be used. The hydraulic supports 718, 720 supporting each end of the axle 712 in the turret bearing system, may be interconnected via a hydraulic line (not shown) connected between respective hydraulic fluid ports 721a,b in the hydraulic supports 718, 720, and sharing the same source of hydraulic fluid such that all the hydraulic supports 718, 720 in a turret bearing system (not shown) comprising roller assemblies 702 may collectively form a biasing system in which the hydraulic supports 718, 720 may work in a coordinated manner to keep the vertical cylindrical turret 506 stationary while the floating platform may roll or pitch under the prevailing weather conditions.

When the vertical cylindrical turret 506 is mounted on the turret bearing system comprising of roller assemblies 702 such that the flange 504 at the upper end of the turret shaft 506 sits on the two contacting surfaces 706, 708 of the groove type roller 704, the axial load acting on the turret bearing system may be distributed to the pair of contacting surfaces 706, 708 of the groove type rollers 704 of the roller assembly 702 in the turret bearing system. Each pair of contacting surfaces 706, 708 of the groove type roller 704 may assume a portion of the total axial load and the portion of the axial load supported by each pair of contacting surfaces 706, 708 may be translated as vertical load acting on the respective pair of surfaces. This vertical load acting on each pair of contacting surfaces 706, 708 is denoted by Fv in FIG. 7.

In addition, when the floating platform rolls or pitches under the influence of the prevailing weather conditions, the radial movement of the turret may cause radial loading on the turret bearing system and this radial force may be distributed to the groove type roller 704 of all the roller assemblies 702. As a result, the distributed radial force may translate to a lateral force acting on the top of each groove type roller 704 as denoted by Fh in FIG. 7. This lateral force Fh acting on the groove type roller 704 may create a moment of force M on the entire roller assembly 702, which may be construed as a tendency to rotate the entire roller assembly 702, as denoted by M in FIG. 7.

As a result of the tendency to rotate slightly or tilt in the direction of the moment M, the pair of contacting surfaces 706, 708 of the groove type roller 704, which are in contact with the flange 504 of the turret shaft 506, may experience a linearly distributed load (shown as load graph 724, 726) on each of the contacting surfaces 706, 708 as illustrated in FIG. 7. In this embodiment, due to the recess 710 between the contacting surfaces 706, 708, the linearly distributed load 724, 726 on each of the contacting surfaces 706, 708 may only possess slight linearity and thus the load distribution may be approximated to a uniformly distributed load. Therefore the intensity of the uniformly distributed load 724 on the contact surface 706 closer to the lateral force may be approximated to $w_2 + \Delta w_2$, while the intensity of the uniformly distributed load 726 on the contact surface 708 away from the lateral force may be approximated to $w_2 - \Delta w_2$ as shown in FIG. 7. The difference between the load intensity on each of the contacting surfaces 706, 708, will result in a restoring moment M' created to counter the moment M of the lateral force Fh.

In this embodiment of the present invention, the restoring moment M' of the roller assembly 702 may be represented by the following equation.

$$M_2' = \Delta w_2 (2a/3)(a/3) + (\gamma \Delta w_2 / 2)(a/3)(a/6 + 2a/9) +$$
$$(\gamma \Delta w_2 / 2)(a/3)(a/6 + a/9) = (2a^2 \Delta w_2)/9 + (a^2 \gamma \Delta w_2)/9$$

Since the linearity of the distributed load on each roller may be negligible and the width of the groove type roller 704 in the roller assembly 702 may be equal to the width of the single roller in a single roller assembly, while keeping all the forces and load constant, the equation of the restoring moment of the roller assembly 702 in this embodiment may be further represented by the equation below. It is understood that other dimensions may also be used $$M_2' = (2a^2 \Delta w_2)/9$$
$$= (2a^2/9)(3\Delta w/2)$$
$$= (a^2 \Delta w)/3$$

Thus, this embodiment may create a larger restoring moment under the same conditions as discussed with respect to prior art system. At the same time, this may be achieved while exposing the contacting surfaces 706, 708 to an almost uniform load distribution across the span of each surface. One qualitative advantage of this embodiment of the present invention would be that the roller assembly 402 may have a longer lifespan under the same operating conditions. This may give rise to an overall improved functions and stable operation of the entire turret bearing system, whereby the impact of radial movement of the turret to the rollers of the turret bearing system may be minimized.

Figure 8:
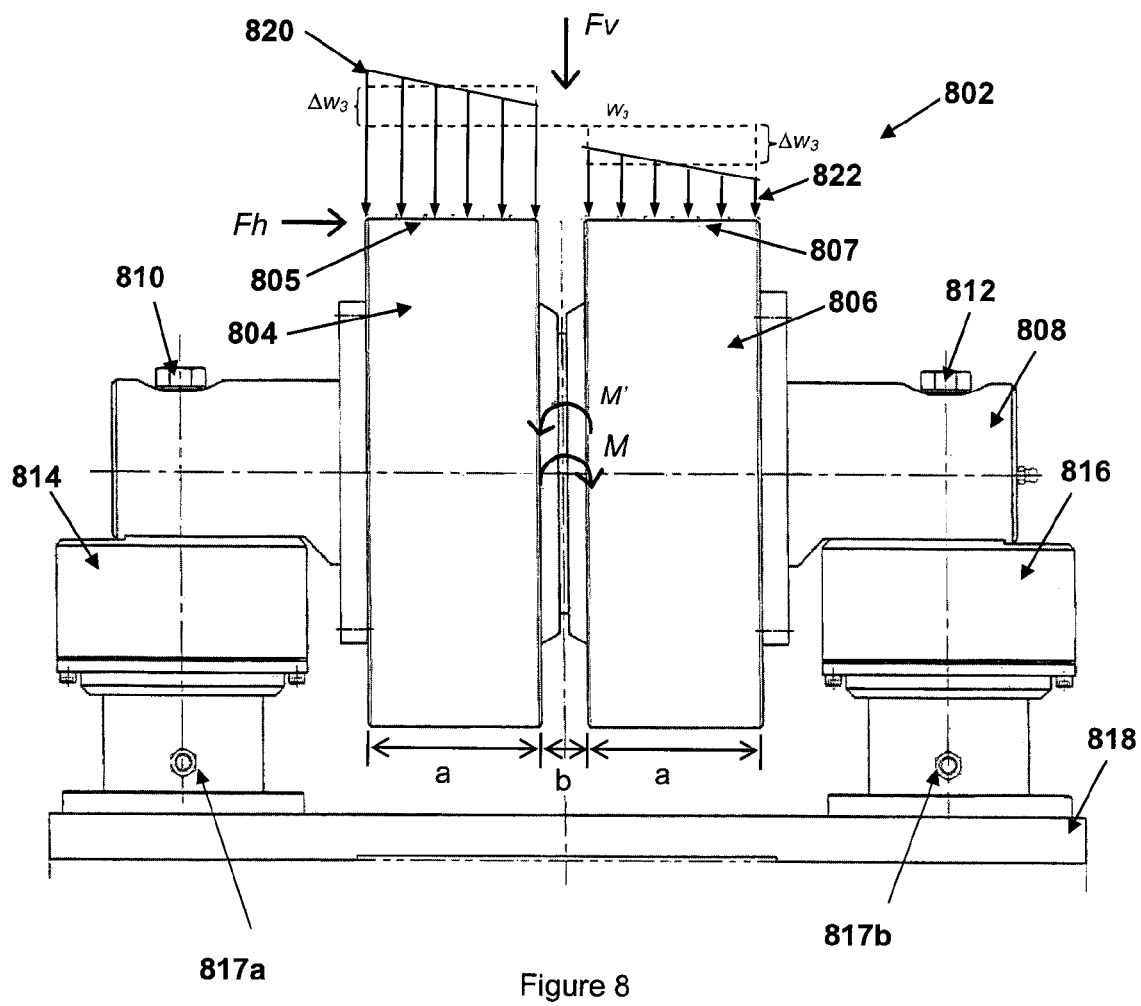
FIG. 8 shows a front view of a roller assembly for a turret according to another example embodiment.

Another embodiment of the roller assembly is illustrated in FIG. 8. The roller assembly 802 may include two rotatable cylindrical rollers 804, 806 supported by a non-rotating axle 808 which may be bolted at both ends by bolts 810, 812 to a respective biasing mechanism, for example, hydraulic supports 814, 816. Both the hydraulic supports 814, 816 may in turn be fixed to a base plate 818.

The two rotatable cylindrical rollers 804, 806 may be spaced slightly apart when connected to the axle 808 such that the rollers 804, 806 may not slide along the axle 808 nor interfere with each others rotation as they rotate, and each of them may be able to rotate at its own rotational speed. The hydraulic supports 814, 816 supporting each end of the axle 808 in the turret bearing system, may be interconnected via a hydraulic line (not shown) connected between respective hydraulic fluid ports 817*a,b* in the hydraulic supports 814, 816, and sharing the same source of hydraulic fluid such that all the hydraulic supports 718, 720 in a turret bearing system (not shown) comprising of roller assemblies 802, may collectively form a biasing system in which the hydraulic supports 814, 816 may work in a coordinated manner to keep the vertical cylindrical turret 506 stationary while the floating platform may roll or pitch under the prevailing weather conditions.

When the vertical cylindrical turret 506 is mounted on the turret bearing system comprising of roller assemblies 802 such that the flange 504 at the upper end of the turret shaft 506 sits on the cylindrical rollers 804, 806 of the rollers assemblies 802, the axial load acting on the turret bearing system is distributed to the rollers 804, 806 of all the rollers assemblies 802 in the turret bearing system. Each pair of rollers 804, 806 may assume a portion of the total axial load and the portion of the axial load supported by each pair of rollers 804, 806 may be translated as vertical load acting on the respective pair. This vertical load acting on each pair of rollers 804, 806 is denoted by Fv in FIG. 8.

When the floating platform rolls or pitches under the influence of the prevailing weather conditions, radial movement of the turret 506 may cause radial loading to the turret bearing system and this radial force may be distributed to the rollers 804, 806 of the roller assembly 802. As a result, the distributed radial force may be translated as lateral force acting on the top of each pair of rollers 804, 806 as denoted by Fh in FIG. 8. This lateral force Fh acting on each pair of rollers 804, 806 may create a moment of force M on the entire roller assembly 802, which can be construed as a tendency to rotate the entire roller assembly 802, as denoted by M in FIG. 8.

As a result of the tendency to rotate slightly or tilt in the direction of the moment M, the contact surfaces 805, 807 of the pair of rollers 804, 806, which are in contact with the flange 504 of the turret shaft 506, may experience a linearly distributed load (shown as load graph 820, 822) on each of the rollers 804, 806 as illustrated in FIG. 8. In this embodiment, due to the slight spacing between the rollers 804, 806, the linearly distributed load 820, 822 on each of the rollers 804, 806 may only possess slight linearity and thus the load distribution on each roller 804, 806 may be approximated to an uniformly distributed load. Therefore the intensity of the uniformly distributed load 820 on the contact surface of the roller 804 closer to the lateral force may be approximated to $w_3+\Delta w_3$, while the intensity of the uniformly distributed load 822 on the contact surface of the roller 806 away from the lateral force may be approximated to $w_3-\Delta w_a$ as shown in FIG. 8. The difference between the load intensity on each of the rollers 804, 806, may result in a restoring moment M' created to counter the moment M of the lateral force Fh.

In this embodiment of the roller assembly 802, the restoring moment M' of the roller assembly may be represented by the following equation.

$$M_3' = $$
$$2\Delta w_3 a(a/2+b/2) + a(\delta\Delta w_3/2)(2a/3+b/2) + a(\delta\Delta w_3/2)(a/3+b/2) = $$
$$\Delta w_3(a^2+ab) + \delta\Delta w_3(a^2/2+ab/2)$$

Since the linearity of the distributed load on each roller may be negligible, assuming the width of each roller 804, 806 in the roller assembly 802 may be equal to the width of the single roller in a single roller assembly, and the width of the spacing between the rollers may be taken to be a fifth of the width of each roller, while keeping all the forces and load constant, the equation of the restoring moment M' of the roller assembly 802 in this embodiment may be further represented by the equation below. It is understood that other dimensions may also be used $$M_3' = \Delta w_3(a^2+ab)$$
$$= (a^2\Delta w/2) + (a^2\Delta w/10)$$
$$= 3a^2\Delta w/5$$

Thus, this embodiment may create a larger restoring moment under the same conditions as discussed with respect to prior art system. At the same time, this may be achieved while exposing the individual rollers 804, 806 to an approximately uniform load distribution. One qualitative advantage of this embodiment of the present invention would be that the rollers assembly may withstand a significantly higher radial force before any permanent deformation or damage to the rollers 804, 806 may occur. At the same time, the rollers 804, 806 may have a longer lifespan under the same operating conditions as the rollers 804, 806 in this embodiment are not repeatedly exposed to uneven load distribution. This may give rise to an overall improved functions and stable operation of the entire turret bearing system, whereby the turret may remain in its horizontal plane regardless of the roll and pitch motions of the floating platform. Furthermore, the twin roller 804, 806 design of the rollers assembly 802 may provide additional advantage in that there is inherent redundancy in the number of rollers provided. Another advantage of the embodiment of the present invention may be that the turret bearing system may preferably not require any additional radial bearing, because the roller assembly 802 in the embodiment of the present invention may be sufficient and adequate to withstand both the axial load and the radial load of the turret shaft.

Figure 9:
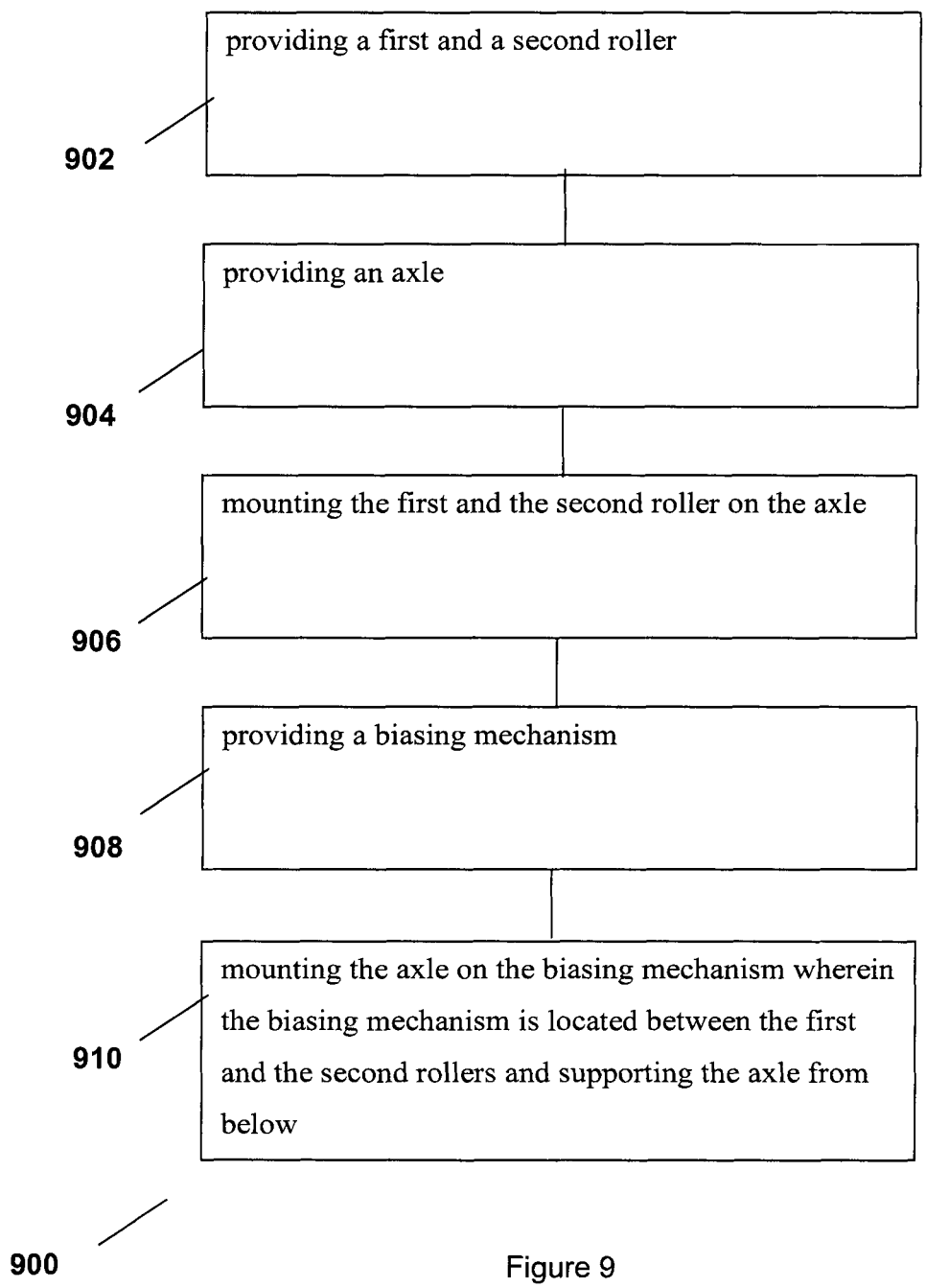
FIG. 9 shows a flowchart illustrating a method of facilitating rotation of a turret according to an example embodiment.

FIG. 9 shows a flow chart 900 illustrating a method of manufacture of a roller assembly for a turret bearing system according to an example embodiment. At step 902, a first and a second roller is provided. At step 904, an axle is provided. At step 906, the first and the second rollers are rotatably mounted on the axle. At step 908, a biasing mechanism is provided. At step 910, the axle is mounted on the biasing mechanism, wherein the biasing mechanism is located between the first and the second rollers, and is supporting the axle.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A roller assembly for a turret bearing system, the roller assembly comprising:
   a first and a second roller;
   an axle on which the first and the second rollers are rotatably mounted, wherein a guiding arm is coupled to each end of the axle; and
   a biasing mechanism located between the first and the second rollers and adjacent the axle for supporting the axle.

2. The roller assembly as claimed in claim 1, wherein the two rollers are independently rotatably mounted on the axle.

3. The roller assembly as claimed in claim 1, wherein the biasing mechanism is a hydraulic support comprising an outer housing vertically movably mounted on a piston.

4. The roller assembly as claimed in claim 3, wherein a guide bearing connects the outer housing of the hydraulic support to the piston to guide the vertical motion of the outer housing.

5. The roller assembly as claimed in claim 3, wherein a cavity is provided in the piston of the hydraulic support, the cavity including a spring mechanism.

6. The roller assembly as claimed in claim 3 wherein the hydraulic support is configured for interconnection with other hydraulic supports to a shared source of hydraulic fluid.

7. The roller assembly as claimed in claim 1 wherein each guiding arm is pivotably mounted on a support frame.

8. The roller assembly as claimed in claim 1, wherein a pair of the guiding arms is configured to guide the vertical movement of the roller assembly.

9. A turret bearing system for a turret of a ship, the turret bearing system comprising a plurality of roller assemblies as claimed in claim 1 wherein the plurality of roller assemblies are configured in use to be disposed radially around a moon pool of the ship.

10. A method of manufacture of a roller assembly for a turret bearing system, the method comprising the steps of:
    providing a first and a second roller;
    providing an axle;
    providing a guiding arm coupled to each end of the axle;
    rotatably mounting the first and the second rollers on the axle;
    providing a biasing mechanism; and
    mounting the axle on the biasing mechanism, wherein the biasing mechanism is located between the first and the second rollers, and is adjacent the axle for supporting the axle.

11. The method as claimed in claim 10, wherein the two rollers are independently rotatably mounted on the axle.

12. The method as claimed in claim 10 wherein the biasing mechanism is a hydraulic support comprising an outer housing vertically moveably mounted on a piston.

13. The method as claimed in claim 12, wherein a guide bearing connects the outer housing of the hydraulic support to the piston to guide the vertical motion of the outer housing.

14. The method as claimed in claim 12, further comprising the step of providing a cavity in the piston of the hydraulic support, the cavity including a spring mechanism.

15. The method as claimed in claim 12 wherein the hydraulic support is configured for interconnection with other hydraulic supports to a shared source of hydraulic fluid.

16. The method as claimed in claim 10 wherein each guiding arm is pivotably mounted on a support frame.

17. The method as claimed in claim 10 wherein a pair of the guiding arms is configured to guide the vertical movement of the roller assembly.

* * * * *